(12) United States Patent
Rutledge, Sr.

(10) Patent No.: US 8,500,943 B2
(45) Date of Patent: Aug. 6, 2013

(54) CONTINUOUS COMPOSITE ROD AND METHODS

(75) Inventor: Russell P. Rutledge, Sr., Big Spring, TX (US)

(73) Assignee: John Crane Production Solutions Inc., Morton Grove, IL (US)

( * ) Notice: Subject to any disclaimer, the term of this patent is extended or adjusted under 35 U.S.C. 154(b) by 0 days.

(21) Appl. No.: 13/293,566

(22) Filed: Nov. 10, 2011

(65) Prior Publication Data

US 2012/0054982 A1 Mar. 8, 2012

Related U.S. Application Data

(63) Continuation of application No. PCT/US2010/034703, filed on May 13, 2010.

(60) Provisional application No. 61/178,295, filed on May 14, 2009.

(51) Int. Cl.
  *F16L 5/00* (2006.01)
  *H02G 3/22* (2006.01)
  *D02G 3/00* (2006.01)
  *B29C 65/00* (2006.01)
  *B32B 37/00* (2006.01)
  *F16G 11/00* (2006.01)

(52) U.S. Cl.
  USPC ............ 156/294; 428/398; 16/2.1; 403/302; 403/313

(58) Field of Classification Search
  USPC ............... 16/2.1, 2.2, 2.3, 2.5; 428/357, 364, 428/397, 398, 399, 400; 403/300, 301, 302, 403/305, 309, 313; 138/89, 89.1, 89.2, 89.3, 138/89.4, 96 R, 96 T; 156/293, 294, 303.1, 156/304.1, 304.2
  See application file for complete search history.

(56) References Cited

U.S. PATENT DOCUMENTS

| | | | |
|---|---|---|---|
| 3,889,579 A | 6/1975 | Wiechowski et al. | |
| 4,360,288 A | 11/1982 | Rutledge et al. | |
| 4,401,396 A | 8/1983 | McKay | |
| 4,563,391 A | 1/1986 | Tanner et al. | |
| 4,602,892 A | 7/1986 | Brookstein et al. | |
| 4,919,560 A | 4/1990 | Rutledge, Jr. et al. | |
| 5,356,252 A * | 10/1994 | Whistler et al. | 411/45 |
| 6,193,431 B1 | 2/2001 | Rutledge | |
| 2008/0217023 A1 | 9/2008 | Rutledge | |
| 2008/0217914 A1 | 9/2008 | Rutledge et al. | |

* cited by examiner

*Primary Examiner* — Philip Tucker
*Assistant Examiner* — Brian R Slawski
(74) *Attorney, Agent, or Firm* — Leydig, Voit & Mayer, Ltd.

(57) ABSTRACT

A continuous composite fiberglass sucker rod for connection between a pump and a pump drive has a rectangular cross section. End fittings having a rod receiving cavity are connected to the rod ends using a curable adhesive. The rod fitting is maintained in a vertical position with the cavity facing upwardly. The rod end portion is positioned in the cavity with the end at the bottom of the cavity. Curable adhesive is introduced into the cavity. A centralizer bushing is used to maintain alignment of the rod relative to the cavity. A portable heating device receives the fitting and rod end portion and enhances the curing process.

6 Claims, 4 Drawing Sheets

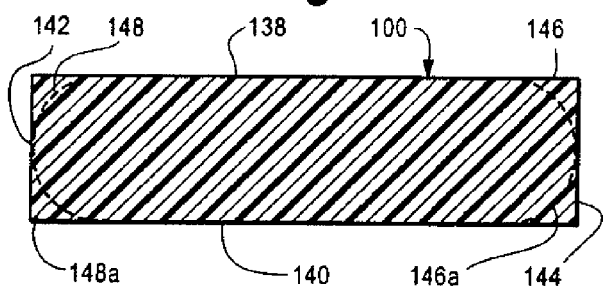
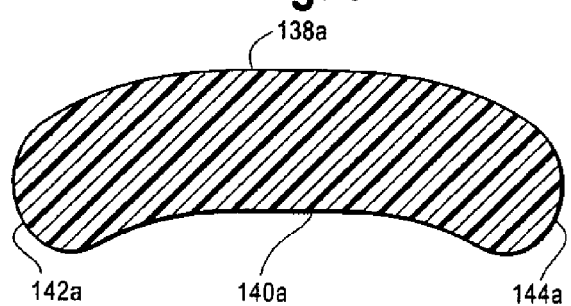
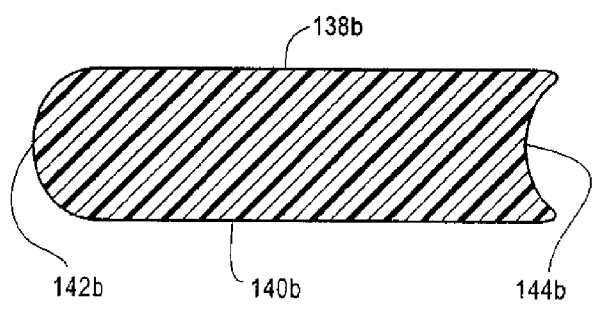
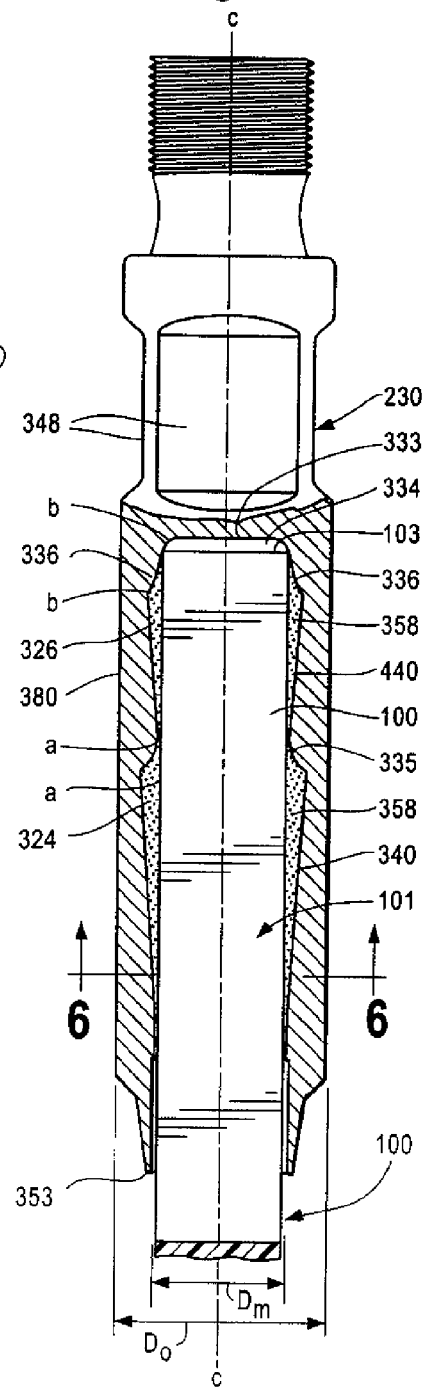

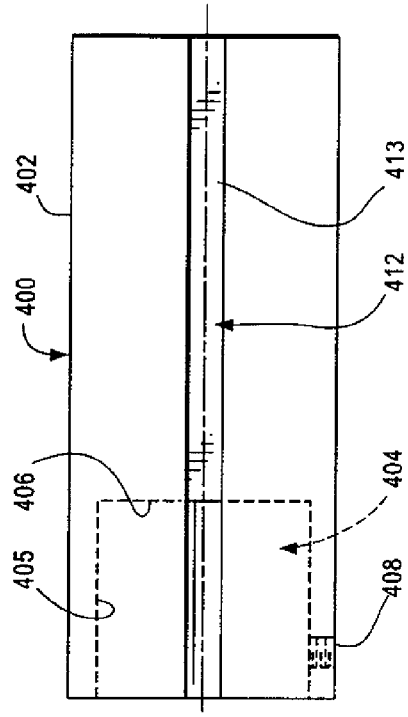
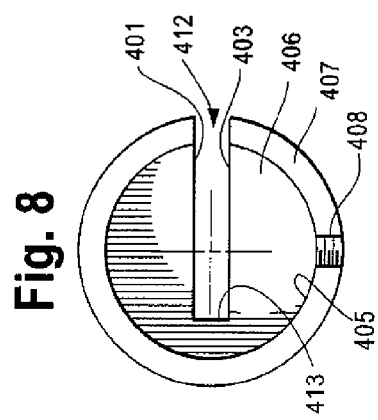
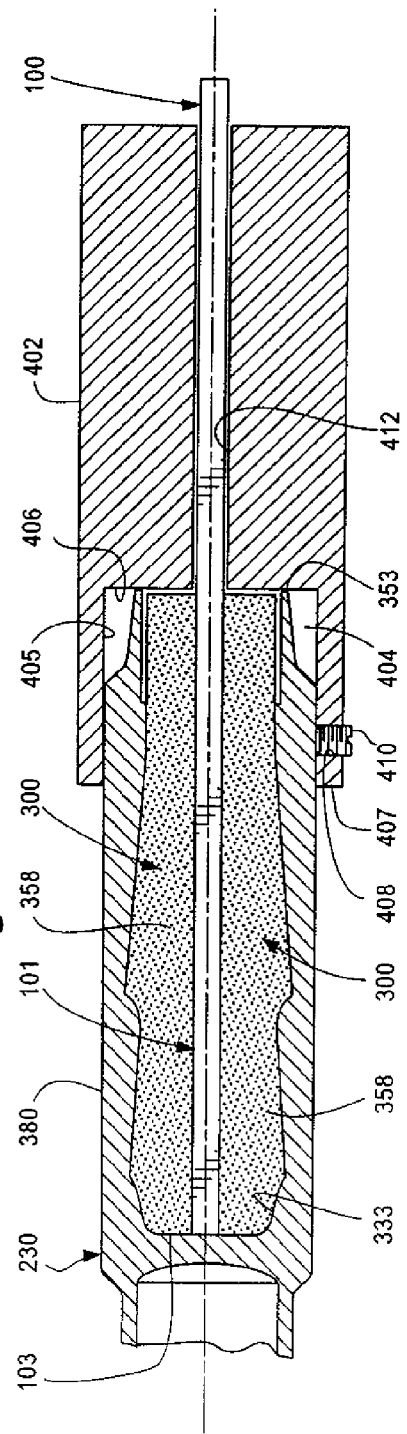

CONTINUOUS COMPOSITE ROD AND METHODS

CROSS-REFERENCE TO RELATED APPLICATIONS

This application is a continuation of application PCT/US2010/034703 with an international filing date of May 13, 2010, which claims priority pursuant to Title 35 USC 119(e) to U.S. Provisional Application No. 61/178,295 filed May 14, 2009, entitled "Continuous Composite Sucker Rod." The entire specification and drawings of the aforementioned application is incorporated by reference herein as if fully set forth. This application is related to U.S. Utility application Ser. No. 12/779,260 filed May 13, 2010, issued as U.S. Pat. No. 7,972,462 on Jul. 5, 2011, entitled "Continuous Composite Rod and Methods."

BACKGROUND OF THE DISCLOSURE

This disclosure relates to continuous composite fiberglass rod for well pump drives and to apparatus and a method for attachment of end fittings to the rod.

During production of a well, for example an oil well, the pressure from the well reservoir often becomes insufficient to transport hydrocarbons to the surface without the assistance of a pump. In such cases, a downhole pump is typically lowered into the well, attached to the lower end of a sucker rod string. The upper end of the rod string is then attached to a pump jack or similar reciprocating surface apparatus. Through reciprocation of the pump jack, the rod string is used to drive the downhole pump, enabling continued production of the well.

Conventionally, sucker rods are formed from lengths of steel, typically about twenty-five (25) feet in length, which are connected to adjacent steel rods using cylindrical, metal end fittings. Steel is inherently heavy. A steel sucker rod requires sizeable equipment and a significant quantity of energy to reciprocate. Further, steel sucker rods weaken and eventually fail after substantial exposure to the corrosive environment within a well, causing steel sucker rods to frequently require replacement. Weakened and failed rods also often cause damage equipment and necessitating difficult and expensive removal operations. Additionally, the assembly of steel sucker rods and the repair of damaged steel sucker rods requires bulky equipment and precision welding, among other factors, which prevents the rapid and efficient construction and repair of steel sucker rods in the field.

To overcome the drawbacks relating to the use of steel sucker rods, fiberglass sucker rods were developed. Composite fiberglass rods provide sufficient strength to withstand axial loads similar to those of steel sucker rods while weighing considerably less. While a steel rod weighs approximately 2.9 pounds per foot when immersed in well fluid, a fiberglass rod of comparable length weighs only. 0.8 pounds per foot, resulting in a significant reduction in operational expenses relating to the energy required to reciprocate the rod. Lighter fiberglass rod segments are also easier and less expensive to transport, and easier and more efficient to handle and install. Additionally, fiberglass resists the corrosive effects of the well environment. Further, composite fiberglass rods exhibit improved flexibility and elasticity over steel rods, resulting a greater effectiveness per stroke of a pump jack.

A conventional fiberglass sucker rod string is formed from cylindrical fiberglass rod segments about 37.5 feet long and about 0.875 inches in diameter, each formed from bundles of glass filaments approximately 15 microns in diameter that have been wetted with a resin and formed into a rod via a pulltrusion process. Multiple round fiberglass rod segments are connected together using steel end fittings similar to those used to connect segments of steel rod, to form a multi-segment string of sufficient length to connect a pump jack and a downhole pump. To form the fiberglass sucker rod string, each rod segment must be individually connected to two end fittings, which are adapted to engage similar end fittings in adjacent rod segments. A curable adhesive, such as epoxy, is normally introduced into an end fitting, and a segment of fiberglass rod is then inserted. Once the adhesive cures, it binds to the fiberglass rod, forming a hardened plug that prevents removal of the rod from the end fitting during pumping operations.

U.S. Pat. No. 4,360,288, the entirety of the specification and drawings of which are incorporated herein by reference, describes a fiberglass sucker rod construction that includes a cylindrical fiberglass rod body having a steel fitting member adhesively bonded to each end thereof. The fitting members have internal receptacles with tapered annular spaces for receiving an epoxy to bond the fiberglass rod, forming wedge-like shapes of cured epoxy to prevent removal of the rod during operation.

U.S. Pat. No. 4,919,560, the entirety of the specification and drawings of which are incorporated herein by reference, describes an oil well sucker rod that includes a fiberglass rod with steel fittings on each end. An annular centering surface and a plurality of dimples within the fitting serve to center the rod at two points within the fitting, while taper angles of the interior tapered surfaces decrease progressively toward the open end of the fitting.

U.S. Pat. No. 6,193,431, the entirety of the specification and drawings of which are incorporated herein by reference, describes a fitting for connecting rods, and a sucker rod construction using the fitting. The interior cavity surface of the fitting is shaped to form one or more annuluses between the inserted rod and the fitting to form axially aligned wedges having a wide portion that narrows toward the open end of the cavity and approaches the rod, asymptotically.

Application for U.S. patent Ser. No. 11/715,085, filed Mar. 5, 2007, describes a continuous non-round composite fiberglass sucker rod connected within a metal fitting using a curable adhesive. The fitting includes a rod interior cavity or receptacle shaped to form one or more tapered cylindrical wedges having a wide portion that narrows toward the open end of the fitting. The cavity contains the adhesive and the end of the rod.

The advantages of a sucker rod string formed from multiple segments of fiberglass rod over a conventional steel sucker rod are numerous. However, a continuous fiberglass rod that extends from the surface of a well to the downhole pump with no interconnections or joints therebetween thereby requiring only the single connection at each end to connect the pump jack to the downhole pump is even more advantageous. A continuous fiberglass rod is significantly easier and less expensive to store, handle, transport, and install by eliminating the time, materials, space, and labor required to create a large number of interconnections between each rod segment.

Early attempts to create continuous composite fiberglass rods encountered numerous difficulties and failures. While fiberglass rod is able to withstand a significant axial load, equal to that of a steel rod, early fiberglass rods, known as ribbon rods, readily cracked or broke if twisted, or bent beyond tolerance. Thus, when attempting to coil a continuous fiberglass ribbon rod about a spool, an impractically large spool is required to avoid coiling the rod beyond its tolerance. With ribbon rod, normally stored on a spool in a single wrap as illustrated in U.S. Pat. No. 4,563,391, a very limited amount of fiberglass ribbon rod could be spooled. The weight of exterior layers of rod on the spool cracks interior layers.

Existing fiberglass sucker rod systems employ rod having a generally cylindrical rod, with a round cross section. However, it has been determined that the ability of a fiberglass rod to withstand the axial loads inherent in downhole pumping operations depends primarily on the cross sectional area of the rod, rather than the shape of the rod. Thus, it is possible to create a composite fiberglass rod having a non-round cross section, thereby having different bending moments of inertia in different bending directions, depending upon the cross-sectional shape of the rod, enabling a composite fiberglass rod having a suitable cross-sectional shape to be coiled about a spool without damaging the rod, to withstand the weight of exterior layers of rod on the spool without cracking, and to withstand the weight of a dispensed portion of the rod on the spooled portion of the rod without breaking.

For example, a conventional fiberglass sucker rod, having a round cross section, would have an bending moment of inertia in any direction. A round fiberglass rod approximately 0.5 inches in diameter would require a spool eight feet in diameter to coil the rod without causing damage, Conversely, a composite fiberglass rod having a rectangular cross-section that is 0.375 inches by 1.75 inches could be successfully coiled on a spool as small as forty eight inches (48") in diameter.

Conventional end fittings or fittings are designed to accommodate cylindrical rods, having a generally round cross section. To date, no method or system exists for creating sucker rod constructions, or similar assemblies, from non-round composite fiberglass rods and/or repairing composite fiberglass rods having a non-round cross section utilizing conventional end fittings.

Conventional systems and methods for assembling and repairing sucker rod assemblies require cumbersome and bulky equipment, thereby restricting the creation and/or repair of sucker rods to designated locations configured for such a purpose. To date, no portable method or system exists for creating sucker rod constructions from composite fiberglass rods and/or repairing composite fiberglass rods in the field.

A need exists for a method usable to create a composite fiberglass rod having a non-round cross section, thereby exhibiting improved flexibility, and storage ability, while retaining an equal or greater axial strength than a comparable round rod.

A need also exists for a method for forming a composite fiberglass rod having a non-round cross section suitable for the formation of a continuous fiberglass rod, lacking any intermediate fittings or joints, thereby conserving the time and labor relating to assembly of sucker rod rings.

Use of such a non-round composite fiberglass rod would enable a continuous composite fiberglass rod to be constructed, extending from the surface of a well to the downhole pump with no interconnections or points therebetween, thereby requiring only the single fitting at each end to connect the pump jack to the downhole pump. Continuous fiberglass rods would be significantly easier and less expensive to store, handle, transport, and install, compared to noon-continuous rods, and would eliminate the time, materials, space, and labor required to create a large number of interconnections between each rod segment. Further, a large quantity of continuous composite fiberglass rod can be wrapped around a spool for facilitating storage and installation, due to the improved bending radius of the non-round composite fiberglass rod.

A need exists for a composite fiberglass rod usable to actuate a downhole pump, having a non-round cross section, thereby exhibiting improved flexibility, and storage ability, while retaining an equal or greater axial strength than a comparable round rod.

A need also exists for a composite fiberglass rod having a non-round cross section, suitable for the formation of a continuous fiberglass rod, lacking any intermediate fittings or joints, thereby conserving the time and labor relating to assembly of sucker rod strings.

A need also exists for a composite fiberglass rod having a non-round cross section that is usable with conventional sucker rod systems and fittings including the conventional steel end fittings, as well as other types of fittings and system components.

A need also exists for a system and method that can evenly heat a quantity of curable adhesive, at a uniform and controlled temperature, to efficient provide an effective connection between a fiberglass rod and an end fitting.

A need exists for a portable system and method that is usable in the field to quickly and efficiently secure an end fitting to a composite fiberglass rod using a curable adhesive.

A further need exists for a system and method that can secure an end fitting to a composite fiberglass rod when the end fitting has a cross sectional shape different from that of the rod.

The present embodiments meet these needs.

SUMMARY OF THE DISCLOSURE

The embodiments of the present disclosure include a method for forming a composite fiberglass rod for use in actuating a downhole pump. A container is provided, the container having a resin therein. The resin can include an adhesive, an epoxy, a polymer, a composite, or combinations thereof. The container can have any shape or volume, depending on the quantity and type of composite fiberglass rod to be produced, and the nature of the operations to be undertaken. The container can be integral with or in communication with one or more heating devices, mixing devices, compression devices, or other equipment to facilitate the movement and use of materials and production of the composite fiberglass rod.

A composite fiberglass rod is provided for use actuating a downhole pump. The composite fiberglass rod can be formed from fiberglass fibers arranged in a parallel bundle, incorporated into a matrix, or other similar materials. Typically, a composite fiberglass rod can be formed by wetting glass filaments, or rovings in a resin, then extruding or pulltruding the mixture while curing the resin, to form a shaped rod.

Multiple rovings of fiberglass can be submerged in the resin. Each roving can be formed from 240 to 280 glass fibers that are coiled together, and 150 rovings, or more, can be combined to form a composite fiberglass rod. In an embodiment, from 240 to 280 rovings of fiberglass can be submerged in the resin. The number of fibers per roving, and the number of rovings used to construct a rod can vary depending on the desired length and diameter of the rod and the nature of the operations to be performed using the rod. For example, a composite fiberglass rod manufactured to withstand extreme temperatures can be formed from a larger number of rovings than a standard composite fiberglass rod.

The rovings and resin are then pulled through at least one shaped hole in the container to form a strand of fiberglass, that is heated to form a composite fiberglass rod. Heat can be provided using a heated die, heat generated by the shaped opening, one or more heating devices in communication with the container, other similar heat sources or combinations thereof. The rate of the pulling of the rovings and resin through the shaped hole can be controlled to allow curing of the resin to form the rod, depending on the curing time and temperature necessary for the mixture of rovings and resin.

In an embodiment, the rovings can be arranged in a parallel bundle, prior to pulling, to prevent looping and flaws in the resulting composite fiberglass rod. A matting bar or similar apparatus can be used to engage the ravings to prevent tangling and/or looping.

Once pulled through the shaped opening, a desired length of composite fiberglass rod can be cut. In an embodiment, the formed composite fiberglass rod can be wrapped around a spool while pulling the rovings and resin through the shaped opening. Once the rod is engaged with the spool, the spool can be used to continue pulling the rovings and resin through the shaped opening while wrapping the composite fiberglass rod around the spool. In an embodiment, the spool can be laterally moveable on a central axis, enabling the composite fiberglass rod to be pulled from the container without bending the rod, while the movement of the spool enables adjacent wraps of rod to be layered about the spool.

The shape of the opening in the container can be selected to provide the composite fiberglass rod with a non-round cross section, in which a first distance extends in a first direction between opposite sides, while a second distance extends in a second direction substantially perpendicular to the first direction between corresponding opposite sides. The non-round cross section can include any polygonal shape other than circular, for providing the rod with a lower bending moment in one direction when compared to the bending moment of another direction. For example, the non-round cross section can be rectangular, or elliptical. Alternatively, the non-round cross section can be a vertically curved shape, that is one of the opposite sides is convex and the other concave enabling mating between overlapping vertical layers of rod on a spool. The non-round cross section can be a horizontally curved shape, for example, in a rectangular rod, one short side can be convex and the opposite short side concave, enabling mating between laterally adjacent wraps on a spool.

The present embodiments enable production and use of a composite fiberglass rod that is continuous, usable to actuate a downhole pump using a surface reciprocating device with substantially no interconnections therebetween. Due to the unique non-round cross sectional shape of the composite fiberglass rod, a single spool can contain up to 15,000 feet, or more, of a continuous fiberglass rod without cracking or breaking the rod. Due to the ability of the fiberglass rod to engage end fittings using a curable adhesive, the present embodiments enable the assembly and/or repair of sucker rod constructions in the field. These and other advantages of the produced composite fiberglass rod will become evident in the foregoing disclosure.

In an embodiment, the ratio of the first distance across the non-round cross section to the second distance across the non-round cross section can range from 3 to 1 to 10 to 1. The second distance can range from 0.125 inches to 0.75 inches. The first distance can range from 0.625 inches to 5.0 inches. For example, a useful composite fiberglass rod can have a rectangular cross section with sides of a length of about 1.0 inch and sides defining a thickness of about 0.25 inches. This is a ratio of 4:1.

The non-round shape of the composite fiberglass rod provides the rod with a bending moment along a first axis greater than that along a second axis, enabling the rod to be wrapped around a spool and/or dispensed into a well without cracking or breaking. The non-round shape of the composite fiberglass rod enables the rod to be manufactured and utilized a continuous fiberglass rod, extending from a reciprocating surface apparatus to a downhole pump with substantially no interconnections.

An end fitting is provided for attachment to each end of the composite fiberglass rod. The end fitting is adapted for securing to a reciprocating surface apparatus and/or a downhole pump. It has a cavity therein, with dimensions sufficient to accommodate the end of the composite fiberglass rod. The cavity does not have a shape similar to that of the cross-section of the rod, however the cavity defines an opening equal to or greater in dimension than the largest dimension of the cross section of the composite fiberglass rod. The cavity is shaped similarly to that disclosed in U.S. Pat. No. 6,193,431 and application for U.S. patent Ser. No. 11/715,085. That is, the cavity has pockets to contain curable adhesive to retain the rod end within the fitting.

The end fittings can be formed from metal, can have any shape, including a generally round cross section. For example, a cylindrical end fitting having a cavity opening minimum diameter of one inch can be used to secure to an end of a composite fiberglass rod having a rectangular cross section with a length of 1.0 inch and a thickness of 0.25 inches.

Curing the adhesive can include providing heat using a portable apparatus, a chemical reaction, ambient energy, or combinations thereof. In an embodiment, a curable adhesive, such as an epoxy, can be used to affix the composite fiberglass rod within the end fittings. Typically, the curable adhesive is initially a liquid that is introduced into the interior of an end fitting. The rod is inserted, compressing the adhesive against the interior surface of the end fitting.

As the curable adhesive cures, it binds to the fiberglass rod, forming one or more plugs or wedge-like sections, which prevents removal of the rod from the end fitting.

Adhesives that are curable by heat, such as that from a portable heat source, ambient heat, or that of an exothermic chemical reaction, such as a two-part epoxy, can be used to enable the end fitting to be attached to the composite fiberglass rod in the field. The ability to assemble and/or repair fiberglass sucker rods in the field is a significant advantage over conventional steel sucker rods, which often must be welded prior to transport.

Usable adhesives could also include polymer adhesives, including polyurethane or one or more plastics, a multi-part or multi-step adhesive, or other similar adhesives. Typically, the curable adhesive is initially a liquid that is introduced into the cavity of the end fitting. The rod is then inserted, compressing the adhesive against the interior surface of the cavity.

The adhesive can then be cured by adding a second component, performing additional steps, or through the passage of time and/or the exposure of the adhesive to ambient conditions. For example, the curable adhesive can cure through a chemical reaction, such as an exothermic chemical reaction that produces sufficient heat to cure the curable adhesive. To secure the fitting and sucker rod, a curable adhesive is introduced into the cavity. An end of a composite fiberglass rod having a non-round cross section, as previously described, is inserted into the adhesive-filled cavity. Insertion of the rod compresses the curable adhesive toward the interior surface of the end fitting cavity. The curable adhesive is then cured, causing the adhesive to bond to the composite fiberglass rod, thereby preventing removal of the rod from the end fitting during reciprocation operations.

In an embodiment, the interior of the cavity of the end fitting can include one or more interior protrusions, wedges, annuluses, or similar regions that enable the adhesive to form wedge-shaped protrusions when cured. The interior protrusions and/or spaces can also serve to center the rod within the end fitting while the adhesive cures. As the curable adhesive cures, it binds to the fiberglass rod, forming one or more plugs or wedge-like sections, which prevents removal of the rod from the end fitting.

One or more clamps or other objects adapted for gripping the composite fiberglass rod could also be used to center and secure the rod during curing of the adhesive. When attaching an end fitting to a continuous fiberglass rod disposed around a spool, the spool can be used to maintain the rod in a vertical orientation during curing of the adhesive.

The system can also include a centralizing bushing, collet, or similar structure adapted to secure to the end fitting, having a cavity therein for accommodating the rod end and centering the rod within the end fitting during curing of the adhesive. The centralizing bushing or collet can be removable after the adhesive cures. For example, a bushing having a rectangular slot and a partial or bore therethrough can be used to engage a fitting adjacent the cavity opening and a composite fiberglass rod having a rectangular cross section to maintain their properly aligned relationship during the curing process.

In an embodiment, the method can include centering the composite fiberglass rod within the cavity while curing the adhesive, through use of clamps, bushings, interior protrusions within the cavity, or combinations thereof. The method can also include maintaining the rod in a vertical orientation during curing of the adhesive, such as through use of clamps, a spool, or similar methods of retaining the rod in a vertical position.

The present embodiments include a portable heating system for attaching a composite fiberglass rod to an end fitting.

In an embodiment, a portable heating apparatus can be used, the apparatus having a receptacle adapted to contain the end fitting with the curable adhesive and the end of the fiberglass rod disposed therein. A heating member within the apparatus can then evenly heat the receptacle to evenly cure the adhesive.

In an embodiment, the system can include a support configured to retain the end fitting in a vertical orientation. The support can be portable, weighing twenty pounds or less, to facilitate the portability of the present system and enable use of the present system on-site, in the field.

The present system further includes a portable heating device, having an opening with dimensions sufficient to accommodate the end fitting with the curable adhesive and composite fiberglass rod therein. The portable heating device includes a heating member for providing heat to the opening to evenly heat the end fitting and cure the curable adhesive.

In an embodiment, the portable heating device can have a fluid media, such as a petroleum product, therein to provide a uniform temperature to the end fitting, enabling even heating and providing control over the temperature of the heating. The heating device can be in communication with a processor, which is usable to control the temperature provided by the heating device.

Portable heat sources enable construction and/or repair of fiberglass sucker rod assemblies to be performed rapidly and efficiently, on-site, in the field, and enable the rod and end fitting to be utilized immediately after assembly and/or repair. The present embodiments thereby enable on-site production and use of composite fiberglass rods and attached end fittings.

The method can further include controlling the temperature provided by the portable heating device, which in an embodiment, can range from 300 degrees Fahrenheit to 400 degrees Fahrenheit. In a further embodiment, the heat from the portable heating device can be provided for a time ranging from 30 minutes to 60 minutes.

The present embodiments thereby enable on-site production and use of composite fiberglass rods and attached end fittings, usable to actuate a downhole pump using a surface reciprocating device. The rod and be a continuous fiberglass rod, requiring only two end fittings for attaching to the downhole pump and the surface reciprocating device. Due to the nature of the curable adhesive and portable heating device, the present system and method can form reliable connections between end fittings and composite fiberglass rods having similar or differing cross sectional shapes in the field. These and other advantages of the present system and method will become evident in the foregoing disclosure.

The present embodiments thereby enable production and use of a composite fiberglass rod that is continuous, usable to actuate a downhole pump using a surface reciprocating device with substantially no interconnections therebetween. Due to the unique non-round cross sectional shape of the composite fiberglass rod, a single spool can contain up to 15,000 feet, or more, of a continuous fiberglass rod without cracking or breaking the rod. Due to the ability of the fiberglass rod to engage end fittings using a curable adhesive, the present embodiments enable the assembly and/or repair of sucker rod constructions in the field. These and other advantages of the present composite fiberglass rod and related systems will become evident in the forgoing disclosure.

BRIEF DESCRIPTION OF THE DRAWINGS

In the detailed description of the embodiments presented below, reference is made to the accompanying drawings, in which:

FIG. 2 is a cross-sectional view of the continuous composite fiberglass rod of FIG. 1.

FIG. 3 is a cross-sectional view of another embodiment of the continuous composite fiberglass rod.

FIG. 4 is a cross-sectional view of another embodiment of the continuous composite fiberglass rod.

FIG. 5 is a side elevational view, partially in section, of an end fitting of the present disclosure with a non-round continuous composite fiberglass rod installed in the receptacle cavity of the fitting.

FIG. 8 is a front view of the centralizer bushing of the present disclosure.

FIG. 9 is a side view of a centralizer bushing of the present disclosure.

FIG. 10 is a cross-sectional side view of the end fitting of FIGS. 2 and 3 with the centralizer bushing of FIGS. 8 and 9 attached.

The present embodiments are detailed below with reference to the listed figures.

DETAILED DESCRIPTION OF THE ILLUSTRATED EMBODIMENTS

Figure 1:
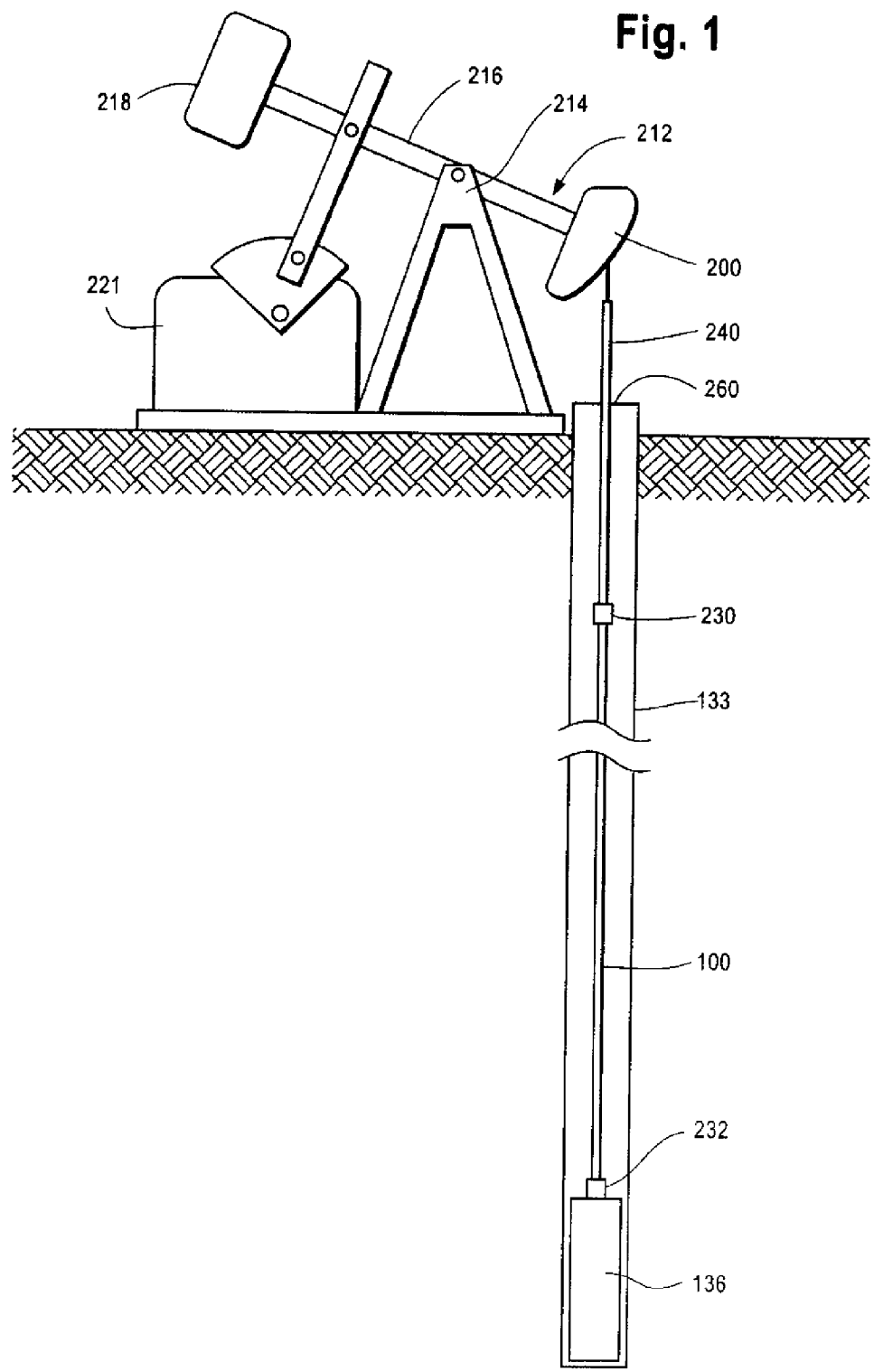
FIG. 1 is a schematic view of a system utilizing a continuous composite fiberglass rod with field-installable end fittings, in accord with an embodiment of the present disclosure.

Referring now to FIG. 1, an embodiment of a system for producing a well is shown, which includes a composite fiberglass rod 100 within a wellbore 133. The composite fiberglass rod 100 is depicted as a continuous rod, having a non-round rod cross-section, which engages the head 200 of a pump jack 212 at the surface of the wellbore 133 and extends to the bottom of the wellbore to engage a downhole pump 136. The composite fiberglass rod 100 extends between the pump jack 212 and the downhole pump 136 with no interconnections therebetween, having an upper end fitting 230 engaging the upper end of the composite fiberglass rod 100 and a lower end fitting 232 engaging the lower end of the composite fiberglass rod 100.

The continuous composite fiberglass rod 100 can be reciprocated using the pump jack 212 or any similar surface apparatus usable to raise and lower the composite fiberglass rod 100 to actuate the downhole pump 136. Typically, pump jack head 200 engages the composite fiberglass rod 100. A beam 216, and a counterweight 218, pivotally mounted to a support frame 214 reciprocate the composite fiberglass rod 100. A pump jack motor 221 is usable to pivotally move the beam 216.

As seen in FIG. 1, the head 200 of the pump jack 212 is connected to a polish rod 240. The polish rod 240 extends through a seal 260, which can include one or more pickoffs other similar types of sealing members. Typically, a polish rod is used with a pump jack system to provide a seal between the wellbore and the atmosphere.

Upper end fitting 230 is shown attached to the upper end of the composite fiberglass rod 100, engaged with the polish rod 240. The end fitting 230 can have male or female threads adapted to engage complementary threads on the polish rod 240. The end fitting 230 can further have threads on the end opposite the polish rod 240 for engaging a collet, bushing, or other similar structure for centering the composite fiberglass rod 100 within the end fitting 230.

A lower end fitting 232 is shown attached to the lower end of the composite fiberglass rod 100. The end fitting 232 can be of a construction similar to that of the upper end fitting, though in an embodiment, the lower end fitting 232 and first end fitting 230 can have opposing threads. The lower end fitting 232 is depicted secured to the downhole pump 136, such that reciprocation of the composite fiberglass rod 100 using the pump jack 212 actuates the downhole pump 136.

The composite fiberglass rod 100 can incorporate fiberglass fibers, or rovings, arranged in a parallel bundle, which are incorporated into a matrix. Any loops, tangles, spaces, gaps or other imperfections in the rovings should be avoided to prevent structural weaknesses in the completed rod. Or, the composite fiberglass rod 100 can include continuous fibers, arranged in a longitudinal direction to provide strength to the rod.

From 240 to 280 glass fibers can be coiled to form a roving, and 150 rovings, or more, can be combined to form a composite fiberglass rod. The number of fibers per roving, and the number of rovings used to construct a rod can vary depending on the desired length and diameter of the rod and the nature of the operations to be performed using the rod. For example, a composite fiberglass rod manufactured to withstand extreme temperatures can be formed from a larger number of rovings than a standard composite fiberglass rod.

The rovings can be wetted using a resin, such as an epoxy, a polyester resin, and/or one or more plastics to form a matrix for supporting the fibers. The resin can be set using an external heat source, ambient heat or light, and/or an exothermic chemical reaction. The resin provides support to the fibers and maintains the shape of the rod. The composite fiberglass rod can be extruded or pulltruded to obtain a rod having a controlled diameter, length, and cross sectional shape. For example, a composite fiberglass rod having a rectangular cross sectional shape could be pulltruded through a heated die having a rectangular opening through which the mixture of fiberglass and resin passes as the resin is cured, to form a rectangular rod. As the rod is pulltruded, varying lengths of the rod can be cut, as needed. A continuous rod, as long as 15,000 feet, or more, can be formed using the pulltrusion process. The continuous rod can be wrapped around a spool as it is formed.

Referring now to FIG. 2, a cross sectional view of an embodiment of a composite fiberglass rod 100 is shown. FIG. 2 depicts the composite fiberglass rod 100 having a rectangular cross sectional shape, with a first side 138 opposite a second side 140, and a third side 142 opposite a fourth side 144. FIG. 2 depicts the first and second sides 138, 140 having a length greater than that of the third and fourth sides 142, 144. The length of sides 138, 140 represents the major dimension of the rod 100. The length of sides 142, 144 represents the minor dimension of the rod 100. The ratio of the major dimension of the rod 100 to the minor dimension of the rod 100 can range from 3:1 to 10:1. The distance between the third and fourth sides 142, 144 comprises a first distance extending in a first direction and the distance between the first and second sides 138, 140 comprises a second distance extending in a second direction, perpendicular to the direction of the first distance. The ratio of the first distance to the second distance can range from 3:1 to 10:1.

The bending moment parallel to the first and second sides 138, 140 is less than that parallel to the third and fourth sides 142, 144, and less than that of a round rod of similar construction. In an embodiment, the length of the first and second sides 138, 140 can be one inch (1.0"), while the length of the third and fourth sides 142, 144 can be one quarter inch (¼"), which provides the depicted composite fiberglass rod 100 with a tensile strength equal to that of a round rod of similar construction having a diameter of about 0.55 inches. However, the bending radius of a ¼ inch by 1.0 inch rectangular composite fiberglass rod is approximately one third that of a 0.55 inch diameter round rod, enabling a ¼ inch by 1.0 inch rectangular rod to be wrapped around a spool of forty-eight inches (48") in diameter without damaging or cracking the rod. A much larger spool would be required to accommodate a round rod due to its larger bending radius, and the weight of multiple layers of round rod around a spool would cause the interior layers of rod to crack.

However, the composite fiberglass rod 100 can have any non-round shape and dimensions sufficient to provide the rod with a greater bending moment in one direction than the bending moment in another direction. The ratio of the distance along one side of the rod to that of a perpendicular side can range from 10 to 1 to 3 to 1. The smaller dimension can range in length from 0.125 inches to 0.625 inches. The larger dimension can range in length from 0.5 inches to 5.0 inches.

Further, while FIG. 2 depicts the composite fiberglass rod 100 having a rectangular cross sectional shape, it should be understood that the composite fiberglass rod 100 can have any non-round cross-sectional shape. For example, as shown in FIG. 2, the corners 146, 148 and the opposing corners 146a and 148a of the composite fiberglass rod 100 can be rounded to form an elliptical or oval shape. In another embodiment, shown in FIG. 3, the first side 138a could be convex while the second side 140a is concave, forming curved shape that enables a mating engagement between overlapping stacked layers of rod on a spool. In a further embodiment, shown in FIG. 4, the first and second sides 138b and 140b are planar and the third side 142b is convex while the fourth side 144b is concave enabling mating between adjacent wraps on a spool.

Figure 6:
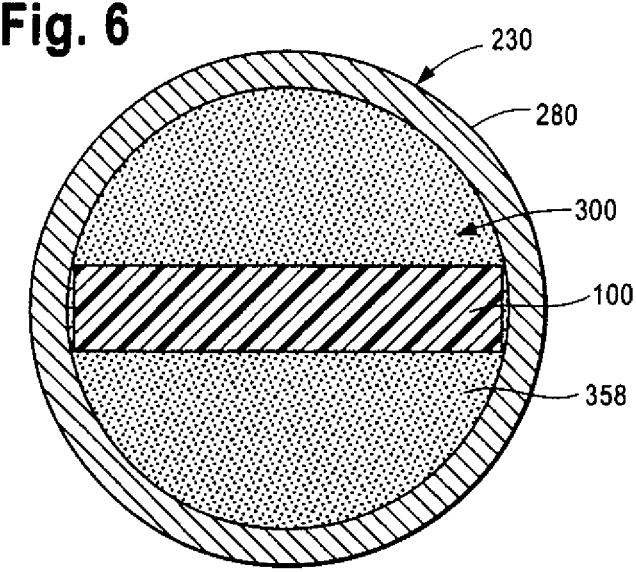
FIG. 6 is an end view, in section, of an embodiment of the continuous composite fiberglass rod within an end fitting taken along line 6-6 of FIG. 5.

FIGS. 5 and 6 illustrate end fitting 230 exemplary of end fittings 230 and 232 attached to composite fiberglass rod 100 of FIG. 1. The end fittings may be configured as described in application for U.S. patent Ser. No. 11/715,085 filed Mar. 5, 2007 entitled "Continuous Sucker Rod and Method of Using Same," the entire specification and drawings of which are incorporated herein by reference. While FIGS. 5 and 6 depict end fitting 230 as having a cylindrical metal body, it should be noted that end fittings having any shape large enough to accommodate the composite fiberglass rod 100 can be used, and that any material significantly durable to withstand reciprocation of the rod is usable.

The composite rod is rectangular in cross-section as depicted in FIGS. 2 and 6. For purposes of illustration, composite rod 100 includes opposite sides 138 and 140 spaced a distance, the minor dimension of the rod, of about one quarter inch (¼"), and opposite sides 142 and 144 spaced a distance, the major dimension of the rod, of about one inch (1").

The end fitting 230 includes an external substantially cylindrical surface 380 terminating in an externally threaded upper end. End fitting 230 also includes a pair of diametrically opposite flat surfaces 348 for enabling an oil field operator to attach a standard sucker rod wrench for connecting and disconnecting the individual sucker rod end fittings from other components such as polish rod 240 and pump 136.

As seen in FIG. 5, the end fitting 230 is formed to define an open axial receptacle cavity 300 or pocket for receiving an end portion 101 of the rod 100. The axial receptacle cavity 300 is defined by a series of generally cylindrical tapered surfaces 340, 440 converging toward the open end which cooperate with the external surface of the rod 100 when the rod 100 is in position in the cavity 300 to retain the rod 100 within the fitting 230. The rod receptacle cavity 300 of fitting 230 is sized to receive the end portion 101 of rod 100. The minimum diameter of the cavity 300 is represented by Dm in FIG. 5. It is slightly larger than the major dimension of rod 100, i.e. the length of sides 138 and 140.

The sucker rod end fitting 230 of the present disclosure has an open axially outer end 353 and a closed axially inner end 333 defined by pilot bore surface 334 sized slightly larger than the major dimension of rod 100. A first generally cylindrical wedge defining surface 340 is proximal to the open end 353 and a second cylindrical wedge defining surface 440 is distal to the open end 353, and proximal to the closed end 333. A transition surface 335 connects from said first surface 340 to the second surface 440. Transition surface 336 is similarly shaped and extends from second annular surface or wedge 440 to cylindrical pilot bore surface 334.

Transition surface 335 and transition surface 336 are formed in the shape of a wave having and outward tapered portion nearer open end 353 and inward tapered portion nearer the closed end 333. Thus, the cross-section of surfaces 335 and 336 are preferably S-shaped, sine-waved shaped, or simply wave-shaped.

A curable adhesive 358 fills the cavity 300 between the rod end portion 101 and the interior generally cylindrical surfaces 340, 440 and transition surfaces 335 and 336. During assembly, the end portion 101 is inserted into the rod receptacle until the edge 103 of the rod end portion 101 is disposed adjacent closed end 333 of cavity 300 within pilot bore surface 334. The rod end at edge 103 is centered within pilot bore surface 334. The sides 142 and 144 of rod 100 are also piloted by the essentially cylindrical surface 340 at minimum diameter Dm. Such engagement essentially by the sides 142 and 144 of the rectangular rod centers the rod relative to the interior surfaces 340 and 400 and transition surfaces 335 and 336 within cavity 300.

The composite fiberglass rod 100 displaces the curable adhesive 358 when inserted into the end fitting 230, compressing the curable adhesive 358 toward the interior surface of the end fitting 230 receptacle. When cured, the curable adhesive 358 bonds with the composite fiberglass rod 100 forming a plug or wedge-like shape between the interior of the receptacle and the exterior of rod end portion 101 that prevents removal of the composite fiberglass rod 100 from the end fitting 230 during pumping operations.

The curable adhesive 358 bonds to the composite fiberglass rod 100 to prevent removal of the composite fiberglass rod 100 from the end fitting 230 during pumping operations. The curable adhesive 358 can be a multiple-component and/or a multiple-step adhesive, such as an epoxy. For example, a first component of the curable adhesive 358 can be introduced into the end fitting 230 then the composite fiberglass rod 100 can be inserted. A second component of the curable adhesive 358 can then be introduced to cure the curable adhesive 358 and secure the composite fiberglass rod 100 within the end fitting 230.

The sucker rod end fitting 230 contains a sufficient quantity of adhesive material 358 to completely fill the voids 324, 326 defined by the fitting converging tapered surfaces 340, 440 and the outer surface of the rod 100 for interconnecting the rod 100 to the fitting 230. When the end portion 101 of rod 100 is inserted into the receptacle, it displaces much of the liquid adhesive and forces it into the voids 324, 326 surrounding the rod 100, where it subsequently cures, forming an angular wedge which is bonded to the rod 100. Since the rod 100 is rectangular, as illustrated in FIGS. 2 and 6, the wedges within the voids 324 and 326 filled with adhesive material 358 are approximately semi-circular in cross-section as best illustrated in FIG. 6. The wedges are widest in the radial direction between sides 138 and 140 of rod 100 and surfaces 330, 440 and narrowest between sides 142 and 144 and surfaces 330 and 440. In this latter relationship, the minimum gap between the sides 142 and 144 and the interior surfaces of the receptacle would be the difference between the major dimension of the rod, and the minimum diameter Dm of the cavity 300.

The end 101 of a rectangular rod 100 inserted into the cavity 300 or receptacle of a fitting 230 or 232 is piloted, or essentially centered by virtue of its contact along sides 142 and 144 with pilot bore surface 333 and the closely spaced relation to the minimum diameter Dm within the cavity 300.

The cured adhesive material forms a sleeve having a series of tapering surfaces defining a series of axially spaced wedges positioned between the rod 100 and the receptacle tapered surfaces 340, 440. This hardened adhesive sleeve forms a bond with the sucker rod 100 to resist the shear force resulting when tension is applied to the rod 100, as if to withdraw it from the end fitting 230. Additionally, tension applied to the rod 100 causes the wedges of cured adhesive material to be forced into compressive engagement with the rod outer surface and with the fitting member tapered surfaces 340, 440. This results in a compression force directed radially inwardly to the center line axis c-c of the end fitting 230 to compress the wedges of adhesive material against the rod 100 to retain the rod 100 in position within the fitting member 230 against the action of such tension applied to the rod 100.

To avoid the concentration of excessive force on the rod 100 from such compression, the wedges defined by surfaces 340, 440, as well as transition surfaces 335 and 336 must be formed such that there are no abrupt changes in the cross-sectional area of the adhesive 358. The desired effect of the wedges on the stress forces acting on them is to disperse the forces, not to concentrate them. The cross-sectional area of the sleeve must change as smoothly as possible so that compressive forces are dispersed equally along the end of the rod 100, and not concentrated excessively at any portion of the rod 100.

Referring again to FIG. 1, preferably, a continuous sucker rod 100 is flexible enough to be wound on a large diameter reel in order to transport the continuous sucker rod 100 form the manufacturing facility to the field for insertion into the wellbore 133. It should be appreciated, by those in the art, that a continuous sucker rod 100 would reduce the overall weight of the sucker rod string, since most of the metal end fittings are eliminated, and would reduce the handling time in that numerous shorter lengths of sucker rods would not need to be attached, end to end, before, or as, the sucker rod is lowered into the wellbore 133. It should be further appreciated that the reels of the coiled continuous sucker rod could be unloaded in the field for insertion into the wellbore 133, or the reels could be mounted on a trailer such that the continuous sucker rod 100 would be uncoiled from the reel, which is mounted on the trailer, and inserted directly into the wellbore 133. It is envisioned that a variety of methods could be utilized to uncoil the continuous sucker rod.

The non-round shape of the composite fiberglass rod 100 provides the rod with a constant thickness, while having significant gripping surface area for a curable adhesive across the surfaces 138 and 140 of rod 100. These features cause the non-round composite fiberglass rod 100 to be easier and less expensive to utilize.

The decreased weight of the composite fiberglass rod 100 versus a conventional steel sucker rod enables the rod to be spooled and dispensed three times as quickly, at one tenth the expense of a conventional steel sucker rod, without requiring a four-member workover crew. In an embodiment, the composite fiberglass rod 100 can be removed from a well and repaired at a rate of 100 feet per minute. For example, when conducting repairs to a composite fiberglass rod within a 3,000 foot well, the rod can be removed within 30 minutes, repaired within 10 minutes, then reinserted within 30 minutes. The same repair for steel sucker rods would require a day and one half to complete.

A continuous composite fiberglass rod can be inserted or removed at a rate of 6,000 feet per hour, with a single individual operating a spool. The spool can be as small as 48 inches in diameter, while containing 15,000 feet, or more, of a continuous fiberglass rod, with the rod being only 75 inches thick on the spool. The depicted composite fiberglass rod thereby reduces transportation, storage, and installation time and related costs.

Additionally, due to the cross sectional configuration and compact nature of such a continuous fiberglass rod, and the ability of the rod to bend without cracking or breaking, a spool containing the continuous fiberglass rod can be mounted on a single trailer, coupled with an injector, one or more clamps, or similar guides or other devices for controlling insertion of the rod into a wellbore. Conventional rod spooling systems require a significant distance between a spool of rod an and an injector device, and a second significant distance between the injector device and the wellbore.

The composite fiberglass rod enables both a spool of continuous rod and an injector device or similar guide for controlling insertion of the rod to be placed within 50 to 60 feet of a wellbore. In an embodiment, the spool of rod can be placed as close as 2 feet from the wellbore.

Figure 7:
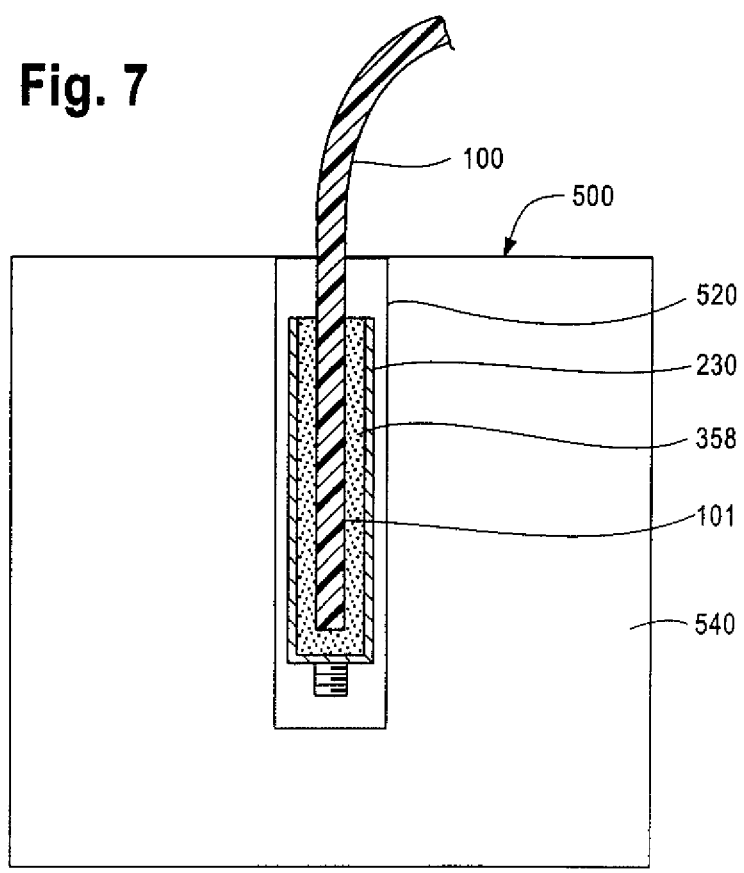
FIG. 7 is a side cross-sectional view of an embodiment of a portable heating apparatus with an end fitting and a composite fiberglass rod disposed therein, usable with the present system and method.

Referring now to FIG. 7, a side cross-sectional view of an embodiment of a portable heating apparatus 500 is shown, with an end fitting 230 and a composite fiberglass rod 100 disposed therein. The portable heating apparatus 500 is shown having a receptacle 520 sized to accommodate the end fitting 230. The receptacle 520 can have dimensions sufficient to contain the entirety of the end fitting 230, or only a portion of the end fitting. The portable heating apparatus 500 further has a heating element 540, adapted to evenly heat the receptacle 520 from all sides, ensuring even curing of a curable adhesive 358 within the end fitting 230.

In an embodiment, a fluid media, such as a petroleum product, can be contained within a portion of the portable heating device 500 for facilitating controlled and even heating and curing of the curable adhesive 358 using a uniform temperature. The fluid media can be periodically or continuously circulated throughout the portable heating device 500 or stationary within the portable heating device 500.

The temperature of the heating element 540 can be controlled using manual or automatic means, and the controls can include use of a computer or other device having a processor to monitor and/or regulate the temperature provided by the portable heating device 500.

The end fitting 230 can optionally have a collet or centralizer bushing secured thereon for centering the composite fiberglass rod 100 within the end fitting 230 while the curable adhesive 358 is cured. The composite fiberglass rod 100 can also be retained in a centered orientation within the end fitting using clamps or other devices adapted for gripping and holding the composite fiberglass rod 100.

The bending radius of the composite fiberglass rod 100 enables the rod to be secured within an end fitting while in a substantially vertical orientation. Conventional fiberglass rods must be secured to their respective fittings in a horizontal orientation, which creates difficulty retaining liquid adhesives during the curing process, and can hinder retaining of the rod in a centered orientation within the fitting.

The centralizer bushing of the present disclosure is shown in FIGS. 8 to 10. It is used to locate, and retain an aligned relationship between the rod 100 and end fitting such as end fitting 230 or end fitting 232 during assembly.

The centralizer bushing 400 is a cylindrical metal body 402 with a partial bore 404 open at one end of the body defining a cylindrical wall 407 having an internal cylindrical surface 405 and a stop or bottom surface 406. A threaded hole 408 open to bore 404 receives a set screw 410.

The size, and depth of the partial bore 404 is sufficient to insert the fitting 230 until the open end 353 abuts stop or bottom surface 405. The outer cylindrical surface 380 of fitting 230 is piloted by surface 405 within the bore 404 in closely spaced relation, The diameter of cylindrical surface 405 of cylindrical wall 407 is sized to be slightly larger than the diameter of external cylindrical surface 380 of fitting 230.

The overall length of the body 402 is about three times the depth of the partial bore 404. A longitudinal slot 412 defined by slot wall surfaces 401 and 403 extends the length of the body 402 through body 402 including cylindrical wall 407. It thereby intersects bottom surface 406. It has a width slightly larger than the minor dimension of composite fiberglass sucker rod 100 between sides 138 and 140. That is, the slot wall surfaces 401 and 403 are spaced a distance to receive the rectangular rod 100 with sides 138 and 140 facing wall surfaces 401 and 403. Depth of slot 412 to transverse longitudinal surface 413 is such that the longitudinal surface 413 aligns with the surface within the receptacle or cavity 300 of fitting 230 representing the minimal dimension Dm of the cavity 300. The overall depth of slot 412 relative to the cylindrical surface 405 is one half the diameter of the cylindrical surface 405 plus one half the diameter Dm, the minimum diameter of cavity 400 across generally cylindrical surface 440. It thus assures alignment of the rod 100 in a position equidistant from the surfaces 340, 440.

Assembly of a fitting 230 to a rod 100 proceeds as described herein. The fitting is positioned vertically with open end 353 facing upward. The cavity 300 is filled with adhesive and the rod end 101 inserted completely into the cavity 300 until the end is centered by engagement with pilot bore surface 334 and the surface within the cavity 300 defining the minimum dimension Dm. Such insertion displaces adhesive from the cavity 300 to accommodate the volume of the inserted rod end 101.

The centralizer bushing 400 is slid onto the rod 100 which passes through slot 412 until side 142 or 144 of the rod 100 contacts longitudinal surface 413 to align the bushing relative to the external cylindrical surface 380 of fitting 230. The centralizer 400 is then slid longitudinally along the rod 100 until the end 353 of fitting 400 contacts bottom surface 406. The cylindrical surface 405 is thus positioned in surrounding piloting relation to the external cylindrical surface 353 of fitting 230 with rod 100 centered in the cavity 300 relative to surfaces 340, 440.

The principal function of the centralizing bushing is to maintain proper spacing between the tapered surfaces 340 and 440 and sides 138 and 140 of the rod. It thus assures alignment of the rod 100 in a position equidistant from the surfaces 340, 440.

Set screw 410 is tightened to temporarily affix the centralizer bushing 400 to the fitting 230. The centralizer retains the proper alignment of the fitting 230 and rod end 101 during the curing process. Once the adhesive 358 is fully cured, the set screw 410 is loosened and the centralizer bushing slid longitudinally until it clears the end of fitting 230. It is then slid transversely of the rod 100 for removal and reuse.

Through use of a curable adhesive that bonds to the composite fiberglass rod 100, the present embodiments enable systems and methods for construction and/or repair of composite fiberglass sucker rod assemblies having end fittings, that can be performed rapidly, in the field, without requiring replacement parts or welding.

Through use of a portable heating device and a curable adhesive that bonds to the composite fiberglass rod 100, the present embodiment enable systems and methods for construction and/or repair of composite fiberglass sucker rod assemblies having end fittings, that can be performed rapidly, in the field, without requiring replacement parts or welding.

The foregoing disclosure and description of the invention is therefore illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combination of features of the various elements, may be made without departing from the spirit of the invention.

Moreover, it will be understood that various directions such as "upper," "lower," bottom," "top," "left," "right," and so forth are made only with respect to easier explanation in conjunction with the drawings and that the components may be oriented differently, for instance, during transportation and manufacturing as well as operation. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and still operate well within the spirit of the invention as described hereinbefore and in the appended claims. It will be seen that various changes and alternatives may be used that are contained within the invention scope.

The invention claimed is:

1. A centralizer bushing for securing a sucker rod within an end fitting, said bushing comprising:
   a solid cylindrical body having ends,
   a partial bore open at one end of said body defined by a cylindrical wall having an internal cylindrical surface, and a bottom surface spaced from said open end,
   a longitudinal slot extending through said solid cylindrical body including said bottom surface, and said cylindrical wall,
   said slot in said solid cylindrical body comprising spaced facing wall surfaces and a transverse longitudinal surface therebetween, wherein the overall depth of the slot to said longitudinal surface relative to the inner cylindrical surface of said partial bore exceeds one half of the diameter of said cylindrical surface defining said partial bore.

2. A centralizer bushing as claimed in claim 1 wherein said partial bore has a depth of about one-third the overall length of the body.

3. A centralizer bushing as claimed in claim 1 wherein said slot includes facing walls in said body and said cylindrical wall, and a transverse longitudinal surface in said body.

4. A centralizer bushing as claimed in claim 3 wherein the cylindrical surface of said cylindrical wall is sized to receive the outer cylindrical surface of an end fitting.

5. In combination, a sucker rod end fitting and a centralizer bushing comprising:
   said end fitting including an outer cylindrical surface and defining a receiving rod cavity at one end thereof,
   said rod receiving cavity including at least one surface defining a minimum diameter thereof,
   a centralizer bushing comprising:
   a solid cylindrical body having ends,
   a partial bore open at one end of said body defined by a cylindrical wall having an internal cylindrical surface, and a bottom surface spaced from said open end,
   a longitudinal slot extending through said solid cylindrical body including said bottom surface and said cylindrical wall,
   said slot in said solid cylindrical body comprising spaced facing wall surface and a transverse longitudinal surface therebetween wherein the overall depth of the slot to said longitudinal surface relative to the inner cylindrical surface of said partial bore exceeds one half of the diameter of said cylindrical surface defining said partial bore.

6. A combination sucker rod end fitting and centralizer bushing as claimed in claim 5 wherein said transverse longitudinal wall of said slot in said body is positioned to align with the surface within a fitting rod cavity defining the minimum diameter of the cavity.

* * * * *